April 3, 1934.  G. E. SANDERS  1,953,267
TIRE RIM
Filed Feb. 16, 1933
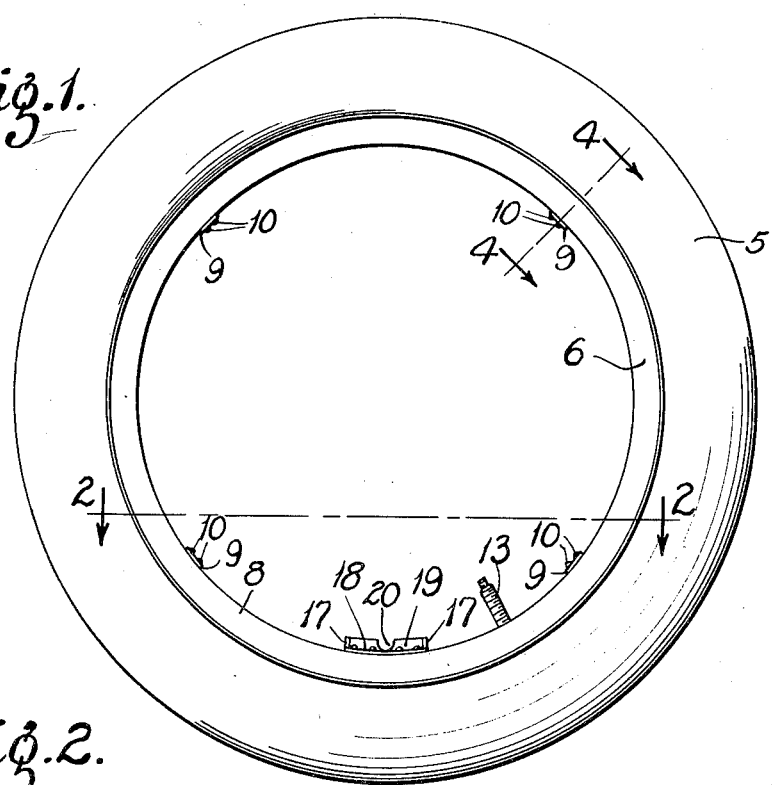
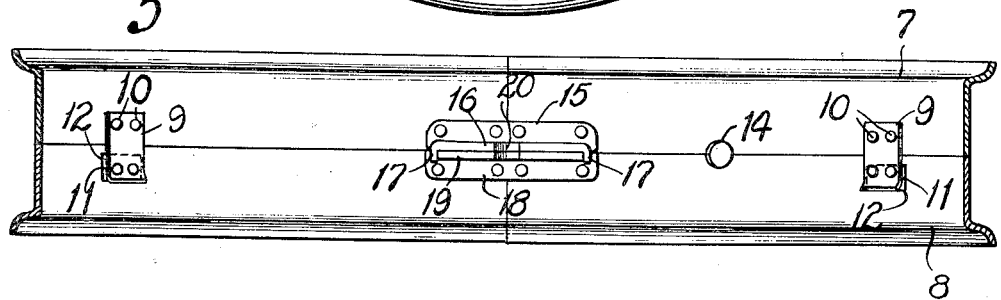
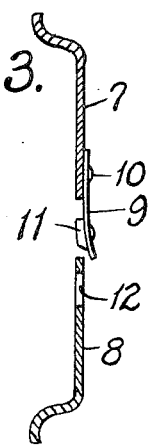
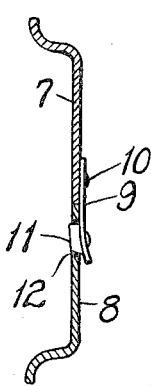
INVENTOR;
GILBERT E SANDERS
BY Arthur C Eckert
ATTORNEY Patented Apr. 3, 1934

1,953,267

UNITED STATES PATENT OFFICE 1,953,267

TIRE RIM

Gilbert E. Sanders, St. Louis, Mo.

Application February 16, 1933, Serial No. 657,051

1 Claim. (Cl. 301—35)

The object of my invention is to make a tire rim.

A further object is to make a tire rim split circumferentially into two portions, so that the rim is made of two parts that may be selectively joined together.

The specific object in making a tire rim, as disclosed herein is to enable the user to easily attach and remove the tire from the rim. The difficulty in removing and attaching the tire from the conventional rim is well known. Several tools are usually necessary in order to attach or detach a tire from the conventional rim. Furthermore skill and experience are necessary to perform the operation with the conventional tire and rim, even with such tools. Furthermore, great strength is necessary in removing the tire from the conventional rim.

By the use of the rim, herein disclosed, a tire may be easily attached to a rim by a person not skilled in such an operation, in a very short period of time, with the expenditure of very little energy, and with no special tool. An ordinary key, or at the most, a small screw driver is all that is necessary to perform the operation.

With these and other objects in view, my invention has relation to certain novel features of construction and arrangement of parts, as will be hereinafter more fully described, pointed out in the claim and illustrated in the drawing, in which Fig. 1 is a front elevation of a rim made in accordance with the disclosure herein, showing it attached to a conventional tire.

Fig. 2 is an enlarged sectional elevation of the tire rim.

Fig. 3 is an enlarged sectional elevation taken radially through the rim, showing the rim sections in their disconnected position.

Fig. 4 is an enlarged sectional elevation on the line 4—4 of Fig. 1 showing the rim sections in their connected position, as they will be when the tire is in position.

Numeral 5 designates a conventional tire casing, and numeral 6 a tire rim generally. The tire rim is formed of two sections 7 and 8, which sections are formed by cutting a conventional tire rim circumferentially, so as to form two equal sections.

Numerals 9 designate lugs, which are secured at regular intervals to the section 7 by means of rivets 10. The lugs 9 may be secured to the section 7 by any other well known means, such as welding. There are four lugs 9 shown in Fig. 1. The lugs 9 extend considerably over the inner edge of the section 7 and are made of brass or other slightly resilient, but rigid material. Near the external end of the lugs 9 are secured locking projections 11. The locking projections 11 are secured to the lugs 9 by any conventional means such as riveting or welding.

In the lateral surface of the section 8 at spaced intervals are formed the slots 12. The slots 12 are preferably rectangular in shape. The locking projections on section 7 are likewise preferably of rectangular shape, and the projections 11 of section 7 and slots 12 of section 8 are of substantially the same size, so that the locking projections 11 may be notched or slid selectively into the slots 12. There are as many projections 11 as there are slots 12 and they are like distances apart.

It will be seen that by the structure thus far described that section 7 may be locked to section 8 by slightly depressing inwardly the locking projections 11 and sliding the section 8 against the section 7, thereby bringing the locking projections 11 into engagement with the slots 12. By virtue of the resilience of the lugs 9, the locking projections 11 will be forced into the slots 12 in the position best shown in Fig. 4. To disengage the section 8 from the section 7, it is only necessary to slightly raise the locking projections 11 radially inwardly and pull the section 7 away from the section 8. In order to facilitate the grasping of the lugs 9, their free ends are curved slightly radially inwardly.

Numeral 13 designates the conventional valve stem.

In order to pass the valve stem 13 through the tire rim 6 radially inwardly, as is customary, the hole 14 is formed one-half in the section 7 and the other one-half in the section 8, as best shown in Fig. 2.

In order to secure the ends of section 7 together and in order to prevent one section from moving circumferentially relative the other, the following means are provided:

Numeral 15 designates a plate, one end of which is riveted or welded to one end of section 7 and the other end of which is riveted or welded to the other end of section 7. The plate 15 is so positioned that when it is welded to section 7, the ends of section 7 abut. On the inner edge of the plate 15, and at right angles to the plate 15, and extending radially inwardly is integrally formed the projection 16. On the outer ends of the projection 16 are formed the outwardly projecting fingers 17.

Numeral 18 designates a plate similar to plate 15 riveted to the free ends of section 8 and having the projection 19, which is the same height as the projection 16, but which does not have the fingers 17, and which is of such arcuate length as to fit within the fingers 17. In the projections 16 and 19 centrally are positioned the arcuate notches 20.

In attaching a tire casing to the rim herein disclosed, the section 7 is laid on the floor, the section 8 having been disconnected and removed therefrom. The tire casing is positioned on the section 7 in the conventional manner with the valve stem 13 projecting in the portion of the hole 14 formed in section 7. Section 8 is then positioned on section 7, so that the projection 19 fits in the fingers 17, the locking projections 11 are elevated one by one by means of grasping the free ends either manually or with a key or other similar implement. The section 8 is then pushed downwardly around the tire casing and in contact with the section 7 until the locking projections 11 are locked or engaged in the slots 12.

In this position the sections of the tire rim are securely attached and the tire casing is securely positioned on the rim sections 7 and 8 and circumferential movement of section 7 relative section 8 is prevented by the engagement of the projection 19 against the fingers 17.

In order to remove a tire casing, the process is reversed. The rim, together with the tire, is laid with section 7 foremost, and the locking projections 11 are elevated permitting the pulling apart of section 8 from section 7, and also permitting the pulling of section 8 from the tire casing.

What I claim is:

A tire rim comprisng two equal circumferential sections, resilient lugs secured to one of said sections, the other section having slots formed therein, locking projections secured to said lugs, the locking projections and slots being so positioned relative each other as to permit the selective engagement of the locking projections in the slots formed in one of said sections, a plate formed on one of said sections, a projection formed integrally with said plate, fingers formed on said projection, a plate formed on the other section of said rim, projections formed on said plate, said projections being of arcuate length so as to permit the positioning of said projection within said fingers, said sections having a valve stem hole formed therein at the jointure between the sections.

GILBERT E. SANDERS.